(No Model.) 2 Sheets—Sheet 1.
S. G. HOWE.
PIPE JOINT.
No. 545,586. Patented Sept. 3, 1895.
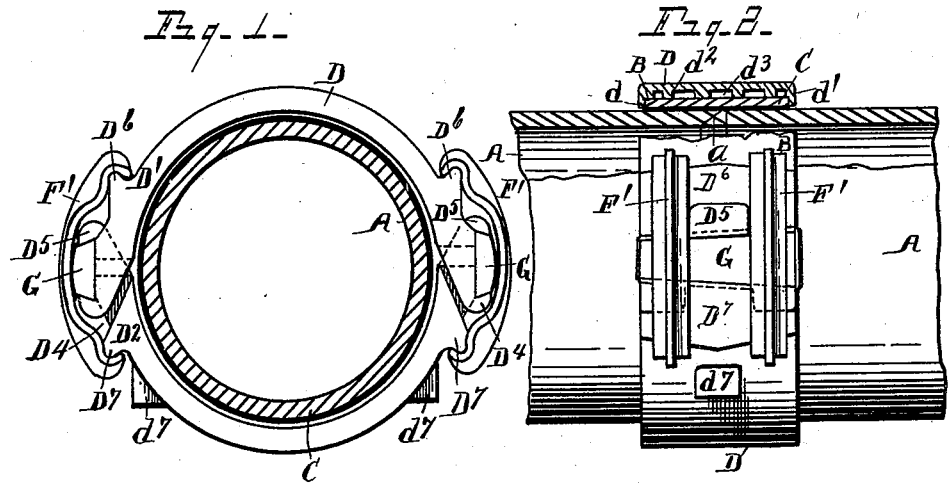
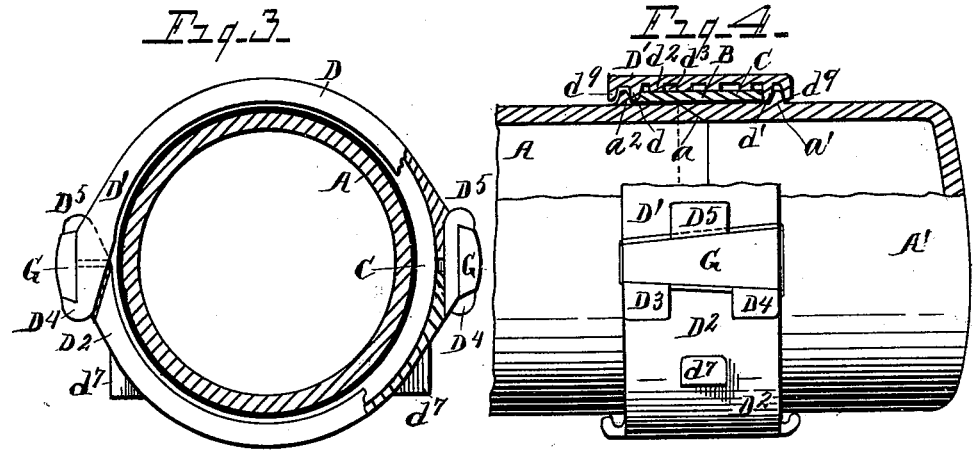
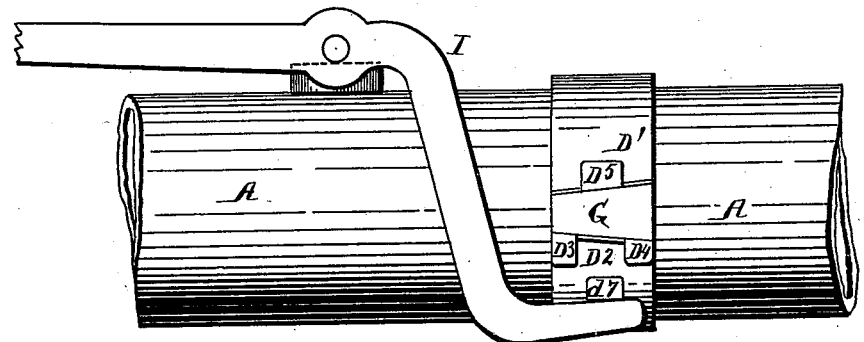
WITNESSES
Otto B. Baenziger.
M. A. Martin.
INVENTOR
Solon G. Howe
By his Attorney
Newell S. Wright.

(No Model.) 2 Sheets—Sheet 2.
S. G. HOWE.
PIPE JOINT.
No. 545,586. Patented Sept. 3, 1895.
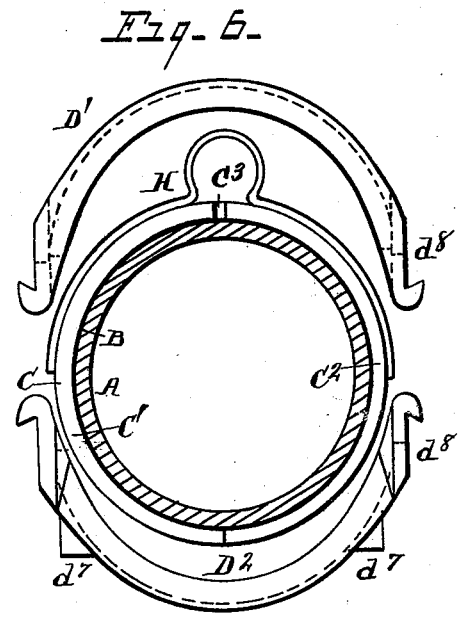
Fig. 6.
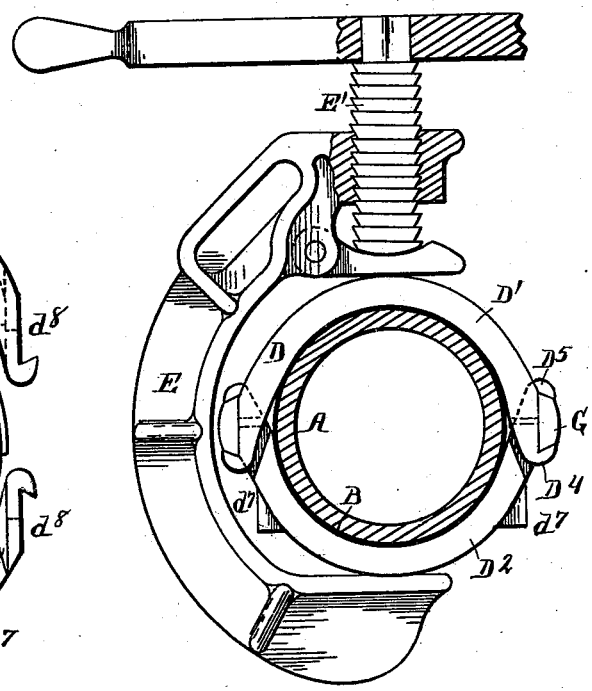
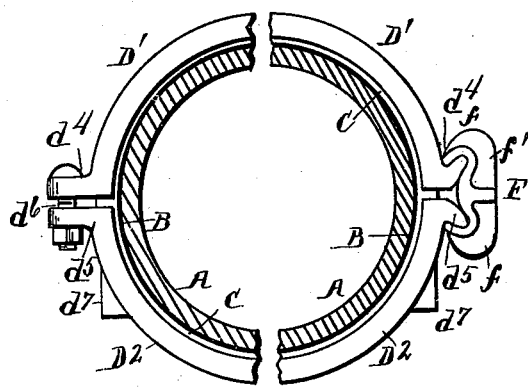
Fig. 8. Fig. 9.
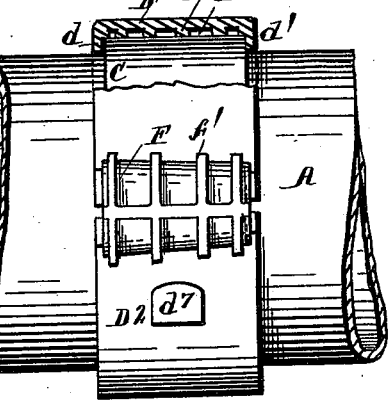
Fig. 10.
WITNESSES
O. B. Basmziger
M. A. Martin
INVENTOR
Solon G. Howe
By his Attorney
Newell S. Wright

UNITED STATES PATENT OFFICE.

SOLON G. HOWE, OF DETROIT, MICHIGAN, ASSIGNOR OF ONE-HALF TO DAVID INGLIS, OF SAME PLACE.

PIPE-JOINT.

SPECIFICATION forming part of Letters Patent No. 545,586, dated September 3, 1895.

Application filed November 1, 1894. Serial No. 527,629. (No model.)

*To all whom it may concern:*

Be it known that I, SOLON G. HOWE, a citizen of the United States, residing at Detroit, county of Wayne, State of Michigan, have invented a certain new and useful Improvement in a Pipe-Joint; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in a pipe-joint, and is designed more particularly to provide an improved combination joint for water-pipes, gas-pipes, and other pipes to which it may be found adapted; and it consists of the construction, combination, and arrangement of devices and appliances hereinafter specified and claimed, and illustrated in the accompanying drawings, in which—

Figure 1 is an end view illustrating features of my invention, showing the pipe in cross-section. Fig. 2 is a view showing my improved device, partly in side elevation and partly in vertical section, longitudinally of the pipe. Fig. 3 is a view similar to Fig. 1, but showing a modification of my invention. Fig. 4 is a similar view to Fig. 2, illustrating the same modification as that embodied in Fig. 3. Fig. 5 is a view in side elevation, illustrating also a lever employed in the application of the joint. Fig. 6 is a view showing the pipe in cross-section and other parts in end elevation, the metal sleeve being in position for assembling, the view illustrating the method of applying my improved joint. Fig. 7 is a view showing my improved joint in end elevation, the pipe in cross-section, and means for compressing the metal sleeve into place upon the underlying wooden sleeve. Fig. 8 is a partial end view showing a bolt to unite the parts of the metal sleeve. Fig. 9 is a similar view showing a clamping-wedge to unite the parts of the metal sleeve. Fig. 10 is a side elevation showing the clamping-wedge illustrated in Fig. 9 in place, portions also being shown in section.

The purpose of my invention is to provide an improved pipe-joint of superior simplicity, economy, durability, and security, as more fully hereinafter set forth.

It will be understood that water-pipes and other analogous pipes are customarily formed in sections with bell ends, and that when adjacent ends of the pipe are brought together a suitable packing is first applied to the base of the orifice of the bell-shaped flange, and that lead is then poured in to complete the joint. The lead is then calked to insure the joint being perfectly tight. In making repairs or in renewing the pipe for any reason, this lead joint must be cut away in order to separate the sections. The bell-shaped flange on the pipe, as ordinarily constructed, obviously requires a large amount of metal to withstand the strain of calking the lead joint. Moreover, in order to cast the pipe with the bell ends to the best advantage special facilities are required, involving large expense.

My invention is intended to simplify the construction of the pipe and "specials," as well as the cost of their manufacture, and to provide a joint which may be more readily and economically applied, and whereby, also, the sections may be readily separated or taken apart whenever occasion may require.

I carry out my invention as follows:

A represents a pipe-section.

A', Fig. 4, represents a special in the form of a cap.

My invention contemplates dispensing with the bell ends on pipes and specials and forming the pipe straight or "spigot." The ends of the pipe and specials may be made straight in cross-section or the ends may be made beveled, so that the two ends of adjacent sections may interlock the one within the other, as shown, for example, in Figs. 2 and 4 at *a*. About the meeting ends of the abutting sections of pipe I first apply a band of fiber or other analogous material, a band of wood fiber being preferably used in making a joint for a water-pipe and a band of sheet-lead being preferably employed in making a joint for gas-pipe. Such a band, of fiber or lead, is indicated at B. Over this fiber or lead band B I apply a wooden sleeve C. This sleeve is preferably made in two halves to facilitate its application, as indicated at C' and C². Over the wooden sleeve I apply a metal sleeve D. The metal sleeve is also preferably constructed in two halves, as indicated at D' D². The metal sleeve is also preferably constructed with inwardly-projected end flanges, as shown at $d$ and $d'$, said flanges engaging over the adjacent edges of the wooden sleeve. I also prefer to construct the metal sleeves with inwardly-projecting ribs, as at $d^2$, forming therebetween corresponding recesses or grooves $d^3$. The metal sleeve is compressed upon the underlying wooden sleeve in any suitable manner within the scope of my invention, and the two parts of the sleeve are held firmly together when in place, also in any suitable manner.

In Fig. 7 I have shown a clamp E and a screw E' for compressing the iron sleeve into place upon the wooden sleeve. This clamp E is engaged with the two parts of the iron sleeve in a well-known manner, as shown, and then by tightening the screw the metal sleeve will readily be compressed, as above noted. I have shown in the accompanying drawings different ways of securing or holding the parts of the metal sleeve in place when so compressed, but I would have it definitely understood that I do not limit myself solely to the means herewith illustrated and described for so holding the metal sleeve in place, as my invention contemplates any means or method suitable for this purpose as coming within the scope of my invention. As shown in Fig. 8, for example, the meeting edges of the two portions of the metal sleeve are provided with outwardly-projecting flanges $d^4$ and $d^5$, through which bolts $d^6$ may be passed to securely hold the metal sleeve in place. In Fig. 9 the flanges $d^4$ and $d^5$ are so constructed as to form dovetailed and wedge-shaped ribs, over which is driven into place a clamping-wedge F, formed with flanged edges $f$ corresponding to said ribs. The clamping-wedge is preferably constructed with ribs $f'$.

As shown in Figs. 3 to 7, the two parts D' and D² are formed with outstanding lugs or ribs. For example, the part D' may be formed with lugs $D^3 D^4$ and the part D² with a lug $D^5$, the lug $D^5$ lapping past the lugs $D^3 D^4$, and vice versa, forming thus between the lug $D^5$ and the lugs $D^3 D^4$ a wedge-shaped and dovetailed recess into which is driven a wedge G.

As shown in Figs. 1 and 2, for application to especially large pipe I have shown the parts D' D² of the metal sleeve formed with additional lugs $D^6$ and $D^7$, so constructed that a corresponding clamp will wedge when driven toward the center of the metal sleeve. To this end each of said lugs is constructed with wedge-shaped edges leading from the ends of the sleeve inward to the center, as shown, so that two clamping-wedges F' F' may be driven over said lugs $D^6 D^7$, one from each end of the sleeve, said clamping-wedges being driven home toward the center of the sleeve. Two sets of such clamping-wedges will of course be used, on opposite sides of the sleeve.

I have shown, also, in Figs. 1 and 2 the wedge G, together with the clamping-wedge F' and corresponding parts for locking the parts of the metal sleeve together. The clamping-wedge F' may be located over any other locking device also within the scope of my invention—as, for example, over the clamping-wedge shown in Fig. 9 or over the bolt connection shown in Fig. 8. This construction makes a doubly-secure lock of the parts D' D² of the metal sleeve. It will be apparent that the ribs $d^2$ within the metal sleeve serve not only to strengthen the sleeve, but, bearing as they do upon different parts of the wooden sleeve, serve to compress the wooden sleeve uniformly and tightly over any inequalities of surface upon the pipe as the metal sleeve is compressed into place. The recesses $d^3$ serve also to receive such portions of the wooden sleeve as may be compressed thereinto in the application of the metal sleeve or through the swelling of the wooden sleeve. These results serve thus to relieve any excessive strain upon the lugs and sleeve in the swelling of the wood.

In the application of my improved joint the two ends of the adjacent sections of pipe are suitably engaged together or brought into alignment. The band B is then applied, and then the two parts C' C² of the wooden sleeve are located in place, pains being taken to see that the two parts C' C² meet underneath the pipe. To allow for any variations in the size of the pipe should the two upper edges of the parts C' C² of the wooden sleeve fail to come closely together, an additional wooden strip of suitable size, as indicated at C³, Fig. 6, may be located in place therebetween. To hold the two parts of the wooden sleeve in place temporarily while the under portion of the metal sleeve is put into position, any suitable means may be employed—as, for example, a clamping-spring. (Shown at H, Fig. 6.) The lower half of the metal sleeve is then located underneath the lower part of the wooden sleeve. Then, by means of a forked lever, (indicated at $l$, Fig. 5,) the workman may hold up the under portion D² of the metal sleeve against the wooden sleeve. The spring H may then be removed and the upper portion of the metal sleeve be engaged in place. This the workman can readily do while sitting on the upper end of the lever I. The clamping or binding wedges are then engaged in place before the lever I is removed. The clamp E is then applied to secure the desired compression of the metal sleeve upon the wooden sleeve and the clamping-wedges driven home. It is designed to secure such a degree of compression of the wooden sleeve as to secure a tight joint with the wood in its naturally dry condition. Of course, when the pipe is laid in the ground the wood will absorb moisture, in consequence of which it will swell and insure the joint being yet tighter and will remain permanently in such condition. A coat of graphite paint or other analogous coating may then be applied over the entire joint to make it practically indestructible. To engage the lever I with the under portion of the metal sleeve, said under portion may be provided with suitable lugs $d^7$. I prefer that the bearing for the inner face of the wedge G should be flat, as indicated, for example, in Fig. 6 at $d^8$, as well as elsewhere in the drawings.

While I have described, hereinbefore, the sleeve C as made of wood, I would have it understood that said sleeve may be made of other material also, if preferred. I deem it more practical and economical and more convenient to make said sleeve of wood, but it may be made of suitable fiber, rubber, or any other suitable material, which may be com pressed within the metal sleeve D, so as to make a tight joint on the surface of the pipe.

It is evident by substituting a sleeve C so constructed, and the metal sleeve D thereover, for the ordinary yarn-and-lead packing used in the customary bell-joint, a great saving is effected both in the expense of materials and in the amount of labor required in applying the joint, as well as in the simplification in casting straight or spigot-end pipe and specials. I estimate that the economy in the cost of constructing the straight spigot-end pipe and specials over the construction of the bell-ends will amount to from eight to ten per cent. in cost of same, while also, owing to the greater simplicity of construction, by which it can be more easily and cheaply laid and jointed, a saving in labor will be effected of nearly or quite fifty per cent.

It will be understood that the cap A' (shown in Fig. 4) may be employed upon a dead end of a pipe or special and that it may also be applied to any given section of pipe for the purpose of testing. To prevent any possibility of the sliding of the cap A' under heavy pressure, I prefer to construct it with lugs $a'$. The adjacent end of the pipe-section A may also be constructed with a similar lug $a^2$. In this case the metal sleeve is also constucted with additional outer lips or flanges $d^9$ to overlap the lugs $a'$ $a^2$.

To separate two adjacent sections of pipe all that is required is to remove the wedge or wedge-clamp, requiring no cutting away of a lead joint, as heretofore necessary. When the wedge or clamp is removed, the metal sleeve can be readily taken off, as well as the other parts of the joint, leaving the pipe in exactly as good condition as before its separation. The metal sleeves can be also readily reapplied, the only part likely ever to require any renewal being the wood or analogous sleeve and the band thereunder, which can be done at a trifling expense, comparatively.

What I claim as my invention is—

1. Two adjoining pipes, provided on their ends with the flanges $a'$, $a^2$, combined with a metallic sleeve D, made in two parts, and provided with end flanges $d^9$, $d$, $d'$, the compressible sleeve held between the flanges $d$, $d'$, and means for compressing the metallic sleeve upon the compressible one; the flanges $a'$, $a^2$, upon the pipes being made to catch between the two flanges at each end of the metallic sleeve, substantially as shown.

2. A pipe joint having in combination a band, a compressible sleeve made of two semi-circular pieces of wood, and a metal sleeve made in two semi-circular parts compressed about and upon the wooden sleeve, and means to hold the parts of the metal sleeve in compressed position upon the wooden sleeve, substantially as set forth.

3. A pipe joint having in combination a compressible sleeve made in sections, and a metal sleeve also made in section, and provided with projecting lugs $D^4$, $D^5$, $D^6$, $D^7$; the lugs $D^6$, $D^7$, each having wedge shaped edges leading from the ends of the sleeve inward toward the center; wedges inserted between the projecting lugs $D^4$, $D^5$, and clamping wedges F' engaging the lugs $D^6$, $D^7$, on each end of the sleeve, substantially as set forth.

4. A pipe joint having in combination a compressible sleeve made in section, a metal sleeve made in sections, a wedging device engaging said metal sections upon the compressible sleeve, said metal sections provided with projecting lugs $D^6$ $D^7$ each having wedge-shaped edges leading from the ends of the sleeve inward toward the center of the sleeve, and additional clamping wedges F' F' engaging said lugs on each end of the sleeve, substantially as set forth.

5. In a pipe joint, a compressible sleeve, and a metal sleeve formed in sections, each provided with projecting lugs $D^6$ $D^7$ having wedge shaped edges leading from the ends of the sleeves inward toward the center, and clamping wedges engaging said lugs on each end of the sleeve, substantially as set forth.

In testimony whereof I sign this specification in the presence of two witnesses.

SOLON G. HOWE.

Witnesses:
N. S. WRIGHT,
M. A. MARTIN.